UNITED STATES PATENT OFFICE.

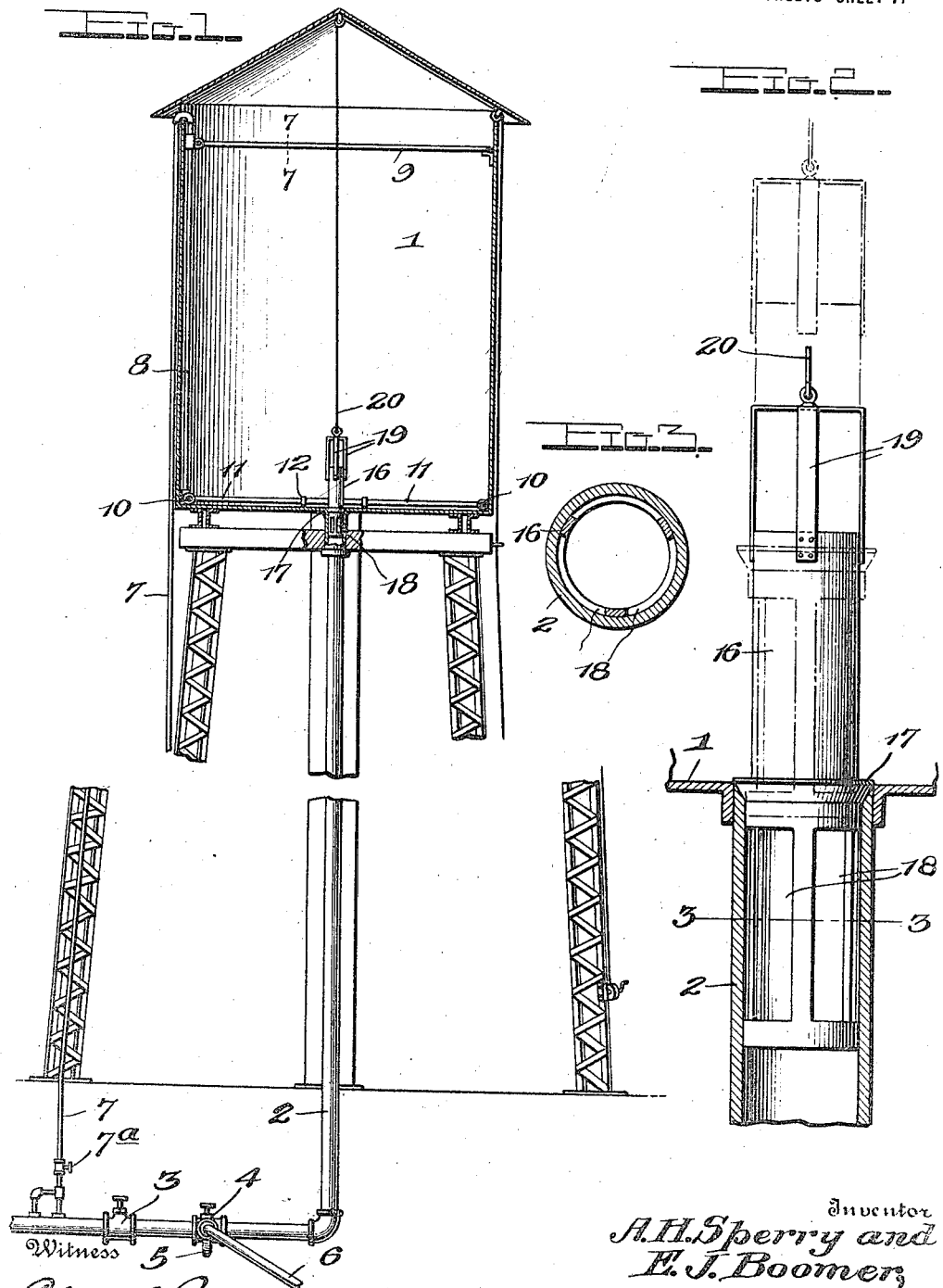

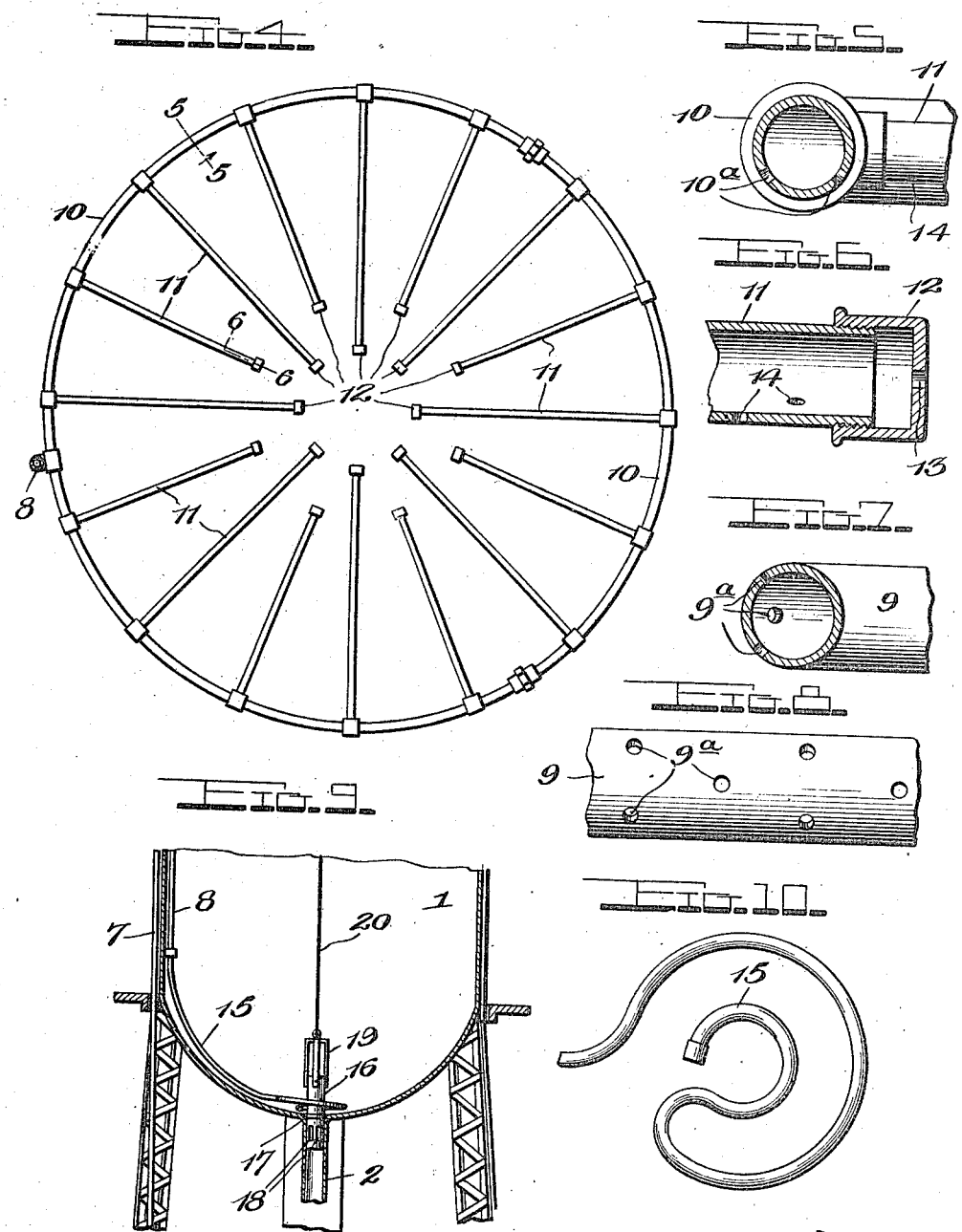

ALBERT H. SPERRY AND ELLIOTT J. BOOMER, OF WILLMAR, MINNESOTA, ASSIGNORS OF ONE-THIRD TO SAMUEL A. SIVERTS, JR., OF MORRIS, MINNESOTA.

WATER-TANK-FLUSHING CAP AND COIL.

1,260,947. Specification of Letters Patent. Patented Mar. 26, 1918.

Application filed May 11, 1917. Serial No. 167,990.

*To all whom it may concern:*

Be it known that we, ALBERT H. SPERRY and ELLIOTT J. BOOMER, citizens of the United States, residing at Willmar, in the county of Kandiyohi and State of Minnesota, have invented certain new and useful Improvements in Water-Tank-Flushing Caps and Coils, of which the following is a specification.

This invention relates to means for flushing out water tanks, and especially those tanks supplying towns and cities with water supply, though applicable to tanks erected for private use.

A certain amount of sediment naturally collects in such tanks and our device prevents this from getting into the water main or service pipes and allows for its ready removal by flushing whenever desired or necessary.

The invention consists in the novel features of construction hereinafter described, pointed out in the claims, and shown in the accompanying drawings, in which:—

Figure 1 is a sectional elevation, partly broken out, of a tank provided with our invention.

Fig. 2 is a detail side elevation, parts being in section, of a flushing cap.

Fig. 3 is a section on the line 3—3 of Fig. 2.

Fig. 4 is a plan view of a bottom flushing ring, the feed pipe being in section.

Fig. 5 is a section on the line 5—5 of Fig. 4.

Fig. 6 is a detail sectional end view of a radial pipe and its end cap.

Fig. 7 is an enlarged section on the line 7—7 of Fig. 1.

Fig. 8 is a side elevation of a portion of the upper flushing ring.

Fig. 9 is a sectional view showing a modified form of lower flushing pipe coils.

Fig. 10 is a plan view of said lower coils.

In the drawings 1 designates the tank which may be of any desired capacity and construction and which is connected to a pipe 2 which may serve as both feed and supply for the tank and which leads to the main or service pipes, not shown. It is provided with a gate valve 3 and between the tank and the gate valve 3 is a second valve 4, goose-neck 5 and sewer connection 6. On the opposite side of the gate valve is tapped in a valve controlled feed pipe 7 which forms a part of our flushing system. This pipe runs up the outside to the top of the tank where it connects with an interior, depending pipe 8.

Adjacent the upper end of the tank the pipe 8 connects with a circular pipe 9, which extends circumferentially about the inner wall of the tank, and parallel to and a slight distance from it. As shown in Figs. 7 and 8 this pipe is provided with perforations $9^a$ on the side adjacent the wall of the tank thereby spraying the same and washing off any dirt or sediment collected thereon.

At its lower end the pipe 8 connects with a second ring or circular pipe 10, perforated as at $10^a$ and provided with inwardly extending radially arranged branches 11, the inner ends of which are partly closed by caps 12, perforated as at 13, and the branches themselves have perforations 14 that spray the tank bottom.

Where the tank has a concave bottom as in Fig. 9 the pipe 10 and its branches 11 are replaced by a coil 15, but perforated the same as the pipe branches 11.

A flushing cap 16 consists of a cylinder having midway its ends a beveled collar 17 fitted thereon which forms a valve fitting in the seat formed by beveling the upper end of the pipe 2.

The lower portion of the cylinder 16, that part that fits into the pipe 2 is longitudinally slotted as at 18. The upper end carries brackets 19 to which is connected a cable 20.

Normally the valve 4 is closed and the valve 3 open, while the valve $7^a$ in the pipe 7 is cut off and the flushing cap is in its lowered position with the collar 17 in its seat. This permits water to pass from the tank 1 through or over the top of the cylinder, and on through the pipe 2 into the main or service pipes, or in reverse direction to the tank 2.

But when the tank is to be flushed and the sediment, which has been held in the bottom of the tank by the cylinder 16, is to be discharged, valve 3 is closed so as to cut the tank off from the main or service pipe, valve 4 opened giving access to the sewer, valve $7^a$ is opened allowing feeding of water under pressure to the rings 9 and 10, and the flushing cap is lifted as shown in dotted lines in Fig. 2. This lifts the collar 17 from its seat and also brings the slots 18 up into the tank.

The spray from the lower ring will wash the sediment out of the tank bottom and the streams sprayed through the end caps 12 will aid in forcing it through the slots 18 and down into the pipe 2, from whence it passes to the sewer.

What we claim is:—

1. The combination with a tank having a bottom discharge pipe, of a flushing cap normally seated in the upper end of the discharge pipe and adapted to be elevated into said tank, and means for directing a spray on the sides and bottom of said tank.

2. The combination with a tank having a bottom discharge pipe, of a flushing cap comprising a cylinder having a valve flange midway its ends, and slotted below said flange, means for elevating said cap, and means for spraying the bottom and sides of the tank during elevation of said cap.

3. In a tank flushing device, a flushing cap comprising a cylinder having a slotted lower portion, and normally acting as an overflow pipe, means for raising the slotted portion of the cap into the tank, and means for directing streams of water on said slotted portion while elevated, and on the tank bottom and sides.

4. In a flushing device for a tank having a bottom discharge pipe, a flushing cap consisting of a cylinder open at each end, and slotted in its lower portion, a beveled collar carried thereby above the slotted portion, said collar forming a valve and seating on the upper end of the discharge pipe, the slotted portion normally resting in the pipe, means for raising such slotted portion from the pipe, and a feed pipe leading into the tank and adapted to spray the sides, and bottom of the tank during elevation of the flushing cap.

5. In a flushing system for tanks having a bottom discharge pipe, a cylinder fitting partly therein and having its lower portion slotted, means for elevating said cylinder, a feed pipe extending downwardly into said tank, pipe rings connected to said feed pipe and in vertical alinement, the upper ring being perforated on the side adjacent the tank wall, and the lower ring on the bottom, and perforated radial branches carried by the lower ring, adapted to spray the bottom of the tank and to direct streams of water toward the cylinder and through the cylinder slots when elevated, as and for the purpose set forth.

In testimony whereof we affix our signatures.

ALBERT H. SPERRY.
ELLIOTT J. BOOMER.

Copies of this patent may be obtained for five cents each, by addressing the "Commissioner of Patents, Washington, D. C."